US011425069B2

(12) United States Patent
Murray

(10) Patent No.: US 11,425,069 B2
(45) Date of Patent: Aug. 23, 2022

(54) HANDLING OF OVERSIZED EMAIL ATTACHMENTS

(71) Applicant: AirWatch, LLC, Atlanta, GA (US)

(72) Inventor: James Murray, Atlanta, GA (US)

(73) Assignee: AirWatch, LLC, Atlanta, GA (US)

( * ) Notice: Subject to any disclaimer, the term of this patent is extended or adjusted under 35 U.S.C. 154(b) by 127 days.

(21) Appl. No.: 16/884,824

(22) Filed: May 27, 2020

(65) Prior Publication Data

US 2020/0287855 A1  Sep. 10, 2020

Related U.S. Application Data

(63) Continuation of application No. 15/419,811, filed on Jan. 30, 2017, now abandoned.

(51) Int. Cl.
| | |
|---|---|
| *H04L 51/08* | (2022.01) |
| *H04L 67/06* | (2022.01) |
| *H04M 1/7243* | (2021.01) |
| *H04L 69/04* | (2022.01) |
| *H04L 51/04* | (2022.01) |

(52) U.S. Cl.
CPC ............ *H04L 51/08* (2013.01); *H04L 51/04* (2013.01); *H04L 67/06* (2013.01); *H04M 1/7243* (2021.01); *H04L 69/04* (2013.01)

(58) Field of Classification Search
None
See application file for complete search history.

(56) References Cited

U.S. PATENT DOCUMENTS

| | | | |
|---|---|---|---|
| 6,957,259 B1 | 10/2005 | Malik | |
| 7,089,286 B1 * | 8/2006 | Malik | H04L 51/066 707/999.01 |
| 2002/0143883 A1 * | 10/2002 | Miyake | H04L 51/00 709/206 |
| 2008/0033973 A1 * | 2/2008 | Tsutsumi | G06F 16/252 |
| 2010/0274856 A1 * | 10/2010 | Bhadriraju | H04L 51/066 709/206 |
| 2012/0185546 A1 | 7/2012 | Dahiya | |
| 2012/0215852 A1 * | 8/2012 | Chen | H04L 51/12 709/206 |
| 2015/0350134 A1 * | 12/2015 | Yang | H04L 67/1095 709/206 |
| 2016/0134571 A1 * | 5/2016 | Lindley | H04L 67/1095 709/206 |
| 2017/0244599 A1 * | 8/2017 | Li | H04L 51/08 |

* cited by examiner

*Primary Examiner* — Chris Parry
*Assistant Examiner* — Abderrahmen Chouat
(74) *Attorney, Agent, or Firm* — Clayton, McKay & Bailey, PC

(57) ABSTRACT

Systems and methods herein provide for improved handling of oversized email attachments. An example system can identify an oversized email attachment before an email is sent, by comparing the size of the attachment to a maximum file size at an email server. The user can then be notified that the attachment is over the allowable file size before sending the email. The system can also un-attach the oversized file, compress it using a suitable compression method, and reattach a compressed file. The compression can be done at the sender's request or automatically.

19 Claims, 8 Drawing Sheets

| EMAIL ADDRESS | ADDRESS | LARGEST ACCEPTED FILE |
|---|---|---|
| JOHN@COMPANYA.COM | SERVER2.COMPANYA.COM | 25 MB |
| JILL@COMPANYB.COM | EMAIL.COMPANYB.COM | 40 MB |
| ANNE@COMPANYC.COM | PC.COMPANYC.COM | 35 MB |

HANDLING OF OVERSIZED EMAIL ATTACHMENTS

This application is a continuation of application Ser. No. 15/419,811, filed Jan. 30, 2017, and entitled "IMPROVED HANDLING OF OVERSIZED EMAIL ATTACHMENTS," which is incorporated herein by reference in its entirety.

BACKGROUND

Despite increasing options for digital communication, such as instant messaging and social media, email communication remains the leading form of business communication. Worldwide, over 200 billion emails are sent on an average day. Despite the impressive volume, email communication continues to suffer from inefficiencies that have long plagued users.

A major inefficiency of email communication occurs when a user receives an unexpected bounce-back email because of a delivery failure. A bounce-back email is an email returned to a sender, notifying the sender that their email was not delivered to the desired recipient and explaining why. Delivery failures can happen for a number of reasons, such as when an email is sent to an address that is no longer in service. A common cause of delivery failures occurs when a user attaches a file that is too large to send.

Almost every email service places limits on file sizes that can be attached to an email. These limits can be per-file—such as a rule limiting each attachment to 20 Megabytes (MB)—or per-email—such as a rule limiting each email to a total of 100 MB—or both. When a user sends an email, that email typically travels through one or more email servers that enforce the file-size limits. If a server determines that the file-size limit has been exceeded, the email transmission is terminated and the sender receives a bounce-back email notifying them of the failure.

This type of failure is not only frustrating for the user, but inefficient on multiple levels. The user will need to resend the failed message, which involves either omitting the oversized file or substituting the file with a smaller replacement. The user may need to manually compress the oversized file to create a suitable replacement. In the meantime, valuable working time has been lost due to an oversized attachment. This is particularly true when the user is on a mobile device, such as a cell phone, where compression and other file modification techniques are cumbersome. In some cases, the inefficiency is compounded by wasted bandwidth. If the email is sent using cellular data on a phone, for example, the data used to send the initial email (and its oversized attachment) is completely wasted.

A system that prevents oversized email attachments from being sent in the first place would greatly improve workplace efficiency and resource utilization. These improvements would be extended even further by a system that intelligently assists a user in resizing oversized email attachments such that an email can be successfully delivered on the first try. For at least these reasons, a need exists for the improved handling of oversized email attachments.

SUMMARY

It is to be understood that both the foregoing general description and the following detailed description are exemplary and explanatory only and are not restrictive of the examples, as claimed.

Systems and methods herein provide for improved handling of oversized email attachments. An example system can identify an oversized email attachment before an email is sent, by comparing the size of the attachment to a maximum file size at an email server. The user can then be notified that the attachment is over the allowable file size before sending the email. The system can also un-attach the oversized file, compress it using a suitable compression method, and reattach a compressed file. The compression can be done at the sender's request or automatically. As used herein, the words "compress" and "compression" can refer to any mechanism for resizing a file in a way that reduces the size of the file relative to its original size.

In one example, a system is provided for handling oversized email attachments. The system can include a non-transitory, computer-readable medium that contains instructions, and a processor that executes the instructions to perform various stages. The stages can include identifying an outgoing email server associated with an unsent email. The processor can identify the outgoing email server based on the email address selected by a user, from which the email will originate. In one example, the outgoing email server is a secure email gateway ("SEG").

The processor can also retrieve a maximum attachment size for the outgoing email server. The maximum attachment size can be specified by the outgoing email server, or can be specified by settings in the email application set by a system administrator. The processor can also identify a file size of a file attached to the unsent email and compare that file size to the maximum attachment size for the email server. In one example, the administrator can specify whether the email application or SEG will automatically compress a file or whether the user will instead have a choice of compression methods. For example, a management server can receive the administrator input and control application or SEG functionality.

If the file size of the attached file exceeds the maximum attachment size for the outgoing email server, the system can notify the user that the file size is too large. For example, the system can display a warning on a graphical user interface ("GUI") associated with the unset email. In some examples, the warning is shown in proximity to a displayed item representing the attached file. For example, the warning can be an icon that overlaps the displayed item.

Restrictions on the recipient's email server can also cause email delivery failures, even when a file is within the acceptable size limits of an outgoing email server. In some examples, the system can identify a recipient email server based on a recipient listed in the unsent email. Based on that identification, the system can retrieve a maximum incoming file size for the recipient email server. If the file size of the attached file exceeds the maximum incoming file size for the recipient email server, the system can notify the user of the issue.

In addition to notifying the user that an email attachment is too large for the outgoing or incoming email servers, the system can provide options for resizing the email attachment. In one example, the notification to the user includes a prompt for the user to provide instructions to compress the attached file. The prompt can include a button that, if selected by the user, instructs the system to compress the file.

The system can select from a number of compression methods when compressing the oversized file. In order to select the optimal compression method, the system can first calculate a required data compression ratio based on the file size of the attached file and the maximum attachment size of the relevant email server. Based on the data compression ratio, the system can select a compression method expected to sufficiently compress the file for transmission. For example, each compression process can have an anticipated reduction range for different file types. The compression can be performed by the user device in one example. Alternatively, it can be performed by the SEG or some other server. Once the file has been compressed, the system can automatically attach the compressed file to the draft email in place of the oversized file.

In one example, the system determines which of the multiple compression processes to apply to the file based on a stored order of processes. If a first compression process does not result in the file being smaller than the maximum file size, then a second compression process can be applied. This can continue based on the stored order until the file is smaller than the maximum file size. The stored order can sort the compression processes based on processing intensity, with less intensive compression processes being attempted first by the system. Different orders of compression processes can be stored for different file types, based on which compression processes are most effective and least processor intensive for that file type.

In another example, a method is provided for automatically resizing oversized email attachments. The method can be carried out by a processor of a user device, for example. Similar to the system described above, the method can include identifying an outgoing email server associated with an unsent email, retrieving a maximum attachment size for the outgoing email server, identifying a file size of a first file attached to the unsent email, and comparing the file size of the first file to the maximum attachment size for the outgoing email server.

If the file size of the first file exceeds the maximum attachment size, the system can act automatically rather than prompting the user with a notification requesting instructions to compress. For example, the system can automatically compress the first file into a second file that is smaller than the maximum attachment size. When the second file is created, the system can attach the second file to the email in place of the first file. This process can occur before or after the email is sent. In some examples, a user is provided with a notification before the email is sent, but if the user attempts to send the email with the oversized attachment still attached, the system automatically resizes the attachment before passing the email through the outgoing email server.

In another example, a non-transitory, computer-readable medium is provided. The medium can contain instructions that, when executed by at least one processor, perform stages for handling oversized email attachments. The stages can include, for example, identifying an outgoing email server associated with an unsent email, retrieving a maximum attachment size for the outgoing email server, identifying a file size of a file attached to the unsent email, comparing the file size of the attached file to the maximum attachment size for the email server, and if the file size of the attached file exceeds the maximum attachment size, notifying the user that the file size exceeds the maximum attachment size.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods herein provide for improved handling of oversized email attachments. The systems described herein can identify an oversized email attachment before an email is sent, thereby saving bandwidth usage and eliminating bounce-back emails due to delivery failures. When the system identifies an oversized email attachment, it can take various types of actions prior to sending the email. In one example, the system notifies the user and allows the user to act accordingly—by manually removing the file and attaching a smaller version, for example. In another example, the system prompts the user for instructions to compress the file, then handles the compression process and replaces the oversized file with a compressed file. In yet another example, the system automatically compresses the file without any user interaction. A hybrid approach can be used as well, where the user is notified and presented with an option to compress, but if the user attempts to send the email without removing or replacing the oversized attachment, the system automatically compresses it before passing it through the outgoing email server. These functions are described in more detail herein.

Figure 1:
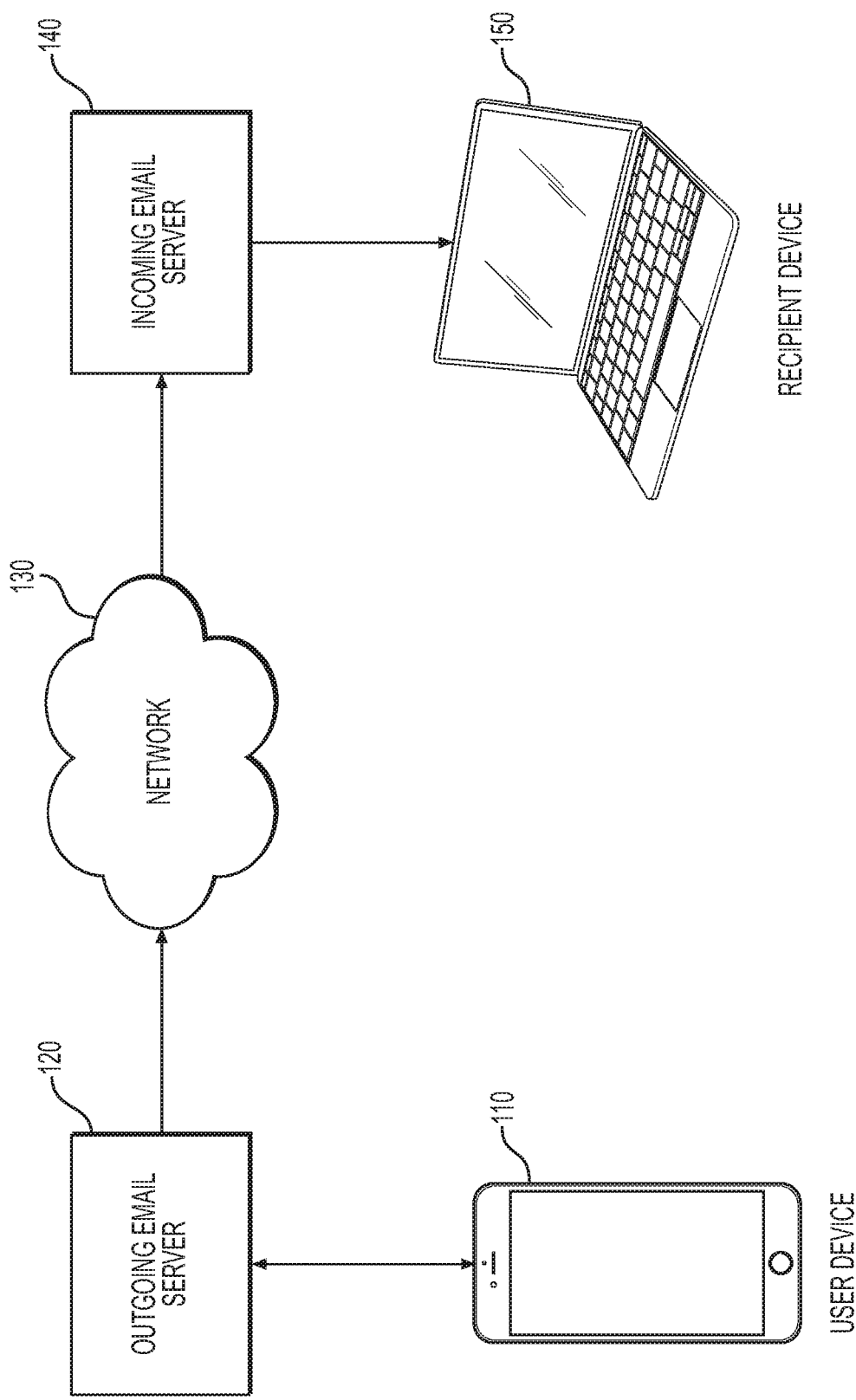
FIG. 1 is an exemplary illustration of system components.

FIG. 1 provides an illustration of system components of an example system for handling oversized email attachments. The system of FIG. 1 includes a user device 110 capable of sending emails. A user device 110 can be any computing device, such as a smartphone, laptop, tablet, personal computer, or workstation. A user device 110 can include a non-transitory, computer-readable medium containing instructions that are executed by a processor. Example non-transitory, computer-readable mediums include RAM and ROM, disks, and other memory and storage that is accessible by a USB port, a floppy drive, CD-ROM or DVD-ROM drive, and a flash drive, among others.

The user device 110 can execute one or more email applications. These applications can be standard email applications installed as part of an operating system, such as APPLE's iOS Mail application or MICROSOFT OUTLOOK. The applications can also be aftermarket email solutions, such as VMWARE's BOXER. The email applications can be managed by a management server that enrolls the user device 110. The management server can provide rules, limits, and other configurations for any managed email application. The management server's functionality is discussed in more detail with respect to FIG. 2.

Regardless of whether the email applications are managed or not, they can utilize one or more outgoing email servers 120 based on the email addresses associated with the application. For example, if the user associates an EXCHANGE-based email address with an email application on the user device 110, the user device 110 will access an outgoing email server 120 that is an EXCHANGE server. If the user associates multiple email addresses, using different email servers, with an email application, the user device 110 can associate with the various email servers. When the user attempts to send an email from a particular email address, the user device 110 can select the appropriate outgoing email server 120 based on the address. Although the singular term "server" is used throughout this disclosure, a "server" can include multiple servers, processors, computing devices, and storage mediums. Further, the term "outgoing email server" is used for element 120 based on a scenario where the user device 110 is transmitting an email. However, the outgoing email server 120 can also act as an incoming email server when delivering incoming to the user device 110.

The outgoing email server 120 can be configured to reject emails based on the size of the email or the size of files attached to the email. For example, the outgoing email server 120 can be configured such that the size of a single email attachment cannot exceed 50 MB. In another example, the outgoing email server 120 can be configured such that the total size of all email attachments of a single email cannot exceed 1 GB. These numbers are merely exemplary, and any size limits can be enforced by an outgoing email server 120.

Typically, a size limit of an email server is only enforced after an email hits the email server. In the system of FIG. 1, however, the user device 110 can retrieve and enforce—or work around—the limits of the outgoing email server 120 before sending the email. An initial step in this process is obtaining configuration information for the outgoing email server 120 at the user device 110. In one example, the email application of the user device 110 accesses the outgoing email server 120 based on a draft email. At some point during the process of drafting an email, the user must select (either manually or by default) an email account from which the email will be sent. Based on the selection of an outgoing email account, the email application on the user device 110 can identify the corresponding outgoing email server 120. This information can be stored at the user device 110 based on the setup parameters used for the email application.

Having identified the relevant outgoing email server 120 associated with an unsent email, the user device 110 can retrieve a maximum attachment size allowed for the server 120. The term "maximum attachment size" can refer to a maximum allowable file size for a single file attachment, but can also refer to a maximum total file size for multiple files attached to the same email. In one example, the user device 110 stores a table or other records having a maximum attachment size based on previous email communication with the outgoing email server 120. For example, when an email with an oversized attachment is rejected, the failure notification provided by the outgoing email server 120 can include a file-size limit that can be parsed and stored by the user device 110. In another example, the user device 110 can make one or more application-programming-interface ("API") calls to the outgoing email server 120, requesting the maximum attachment size and receiving the size limit in response. The maximum attachment size can also be set in a provisioning response during set up, such as in a MICROSOFT Exchange ActiveSync protocol.

In yet another example, the user device 110 can receive instructions from a management server to enforce one or more maximum attachment size limits for specific email servers. The user device 110 or a mail server 120 or 140 can notify the management server of maximum file size limits based on rejected emails. The management server can store or update the file size maximum, and send the file size maximum to other user devices 110. The user devices 110 can then locally enforce the new file size maximum when drafting emails that will go to the corresponding outgoing email server 120 or incoming email server 140.

When a user attaches a file to an unsent email, the user device 110 can determine a file size of the attached file. The user device 110 can compare the file size to the maximum attachment size for the relevant outgoing email server 120. This can occur upon attachment or later, such as when the user selects to send the email. If the file size is below the maximum attachment size, no further action is required aside from the normal email operations. However, if the file size exceeds the maximum attachment size, the user device 110 can perform various actions. The determination can be made for a single file or for multiple files. Different maximum thresholds can be stored for cumulative email size, single attachment size, or attachments of specific file types.

In one example, the user device 110 can provide a notification to the user that the file size exceeds the maximum attachment size. As shown in more detail in FIGS. 4 and 5, the user device 110 can display a notification on a GUI of the user device 110. For example, the user device 110 can display a window informing the user that the attached file exceeds the maximum size limits for the email application or the outgoing email server 120. Based on the notification, the user can decide how to continue—for example, by removing the file and attaching a compressed or alternate version that fits within the size limit.

In another example, the notification can notify the user that the file size exceeds the maximum attachment size and prompt the user for instructions to compress the attached file. Prompting the user can include providing a button that, if selected by the user, causes the user device 110 to compress the relevant file using a compression method. The compression method can be selected from multiple available compression methods by the email application, in one example. Alternatively, the prompt can also provide the user with a selection between compression methods, such that the user can control how the user device 110 compresses the file. In either case, after instructing the user device 110 to compress the file, the user device 110 can automatically un-attach the file, compress it, and reattach the compressed file.

In yet another example, the user device 110 can automatically compress the oversized attachment based on the user's action or inaction. For example, the notification provided by the user device 110 can inform the user that the attached file exceeds the maximum attachment size and will be automatically compressed if the user attempts to send the email with the oversized attachment. In another example, the user device 110 can automatically compress the oversized file as soon as it is attached to the draft email, providing a notification to the user that the file has already been compressed.

The email application can provide the user with a choice of compression methods or can select a compression method automatically. In one example, the compression method is selected based on a data compression ratio required to adequately reduce the size of the file. If a file needed to be compressed to 50% of its original size, for example, the required data compression ratio would be 2:1. The user device 110 can then select an appropriate data compression method based on the required 2:1 compression ratio. In another example, the email application can make the selection based on a stored ranking of available compression methods. Different stored rankings can exist for different file types. The email application can pick compression methods based on the stored rankings for the file types of the attachments. The rankings can be based on a combination of effectiveness and processor intensiveness, for example.

In another example, the email is routed through a SEG. The SEG can be positioned between the user device 110 and the outgoing email server 120. Alternatively, the SEG can be part of the outgoing email server 120. The SEG 120 can apply the compression method to the file attached in the email, resulting in a compressed file. The SEG 120 can then reattach the compressed file to the email in place of the original uncompressed file.

In some examples, the user device 110 can select a first compression method, compress the oversized file, and then compare the size of the compressed file with the relevant maximum attachment size. If the compressed file still exceeds the maximum attachment size, the user device 110 can select a more aggressive (or lower ranked) compression method and repeat the process of compressing the file and comparing it to the maximum attachment size. For example, the user device 110 can compress the file using H.264 lossless compression in a first step. If the compressed file does not fall under the allowable limit, the user device can compress the file using APPLE Intermediate Codec, which should provide a larger compression ratio than lossless compression. If that still fails to reduce the file size a sufficient amount, the user device 110 can compress the file using MPEG-4 compression and compare the resulting file to the maximum allowable size. These compression algorithms are merely examples—any compression techniques can be used.

By ensuring that attachments fall under the maximum attachment size of the outgoing email server 120 before sending the email, an email application of the user device 110 can avoid an email failure at the outgoing email server 120. The outgoing email server 120 can then send the email and its attachments over a network 130, such as the Internet, to an incoming email server 140 for a recipient device 150. The components of FIG. 1 can communication with each other over a network using one or more modulators, demodulators, multiplexers, demultiplexers, network communication devices, wireless devices, antennas, modems, and any other type of device configured to enable data communication through a communication network. The network over which files are sent and retrieved can be an enterprise network in one example. The network can include the Internet, a local area network, or any other suitable communication platform. The components can communicate over the network using one or more modulators, demodulators, multiplexers, demultiplexers, network communication devices, wireless devices, antennas, modems, and any other type of device configured to enable data communication through a communication network.

The recipient's incoming email server 140 can include limits on attachment sizes for incoming emails, similar to the limits enforced at the outgoing email server 120. While the recipient's email server 140 is referred to as an "incoming email server" for this discussion, the server 140 can handle both incoming and outgoing email in some examples. The incoming email server 140 can include a maximum attachment size, such that any emails exceeding the maximum attachment size are rejected. If the incoming email server 140 has a lower maximum attachment size than the outgoing email server 120, then some emails might fail to deliver even though they passed through the outgoing email server 120 without issue.

To avoid potential delivery failures, the user device 110 can account for the maximum attachment size of the incoming email server 140. In some examples, the user device 110 can identify the incoming email server 140 based on an email address listed in a recipient field of a draft email, such as the "TO," "CC," or "BCC" fields. The user device 110 can access an API of the incoming email server 140 to retrieve information identifying the maximum attachment size of the server 140. For emails listing multiple recipients, the user device 110 can access multiple email servers 140 corresponding to each intended recipient. Having retrieved the maximum attachment size for any recipient's incoming email server 140, the user device 110 can perform the compression process explained above to ensure that the attachments to the email fall under the maximum attachment size for all incoming email servers 140 (as well as the outgoing email server 120).

In some examples, the user device 110 might be unable to retrieve a maximum attachment size from an incoming email server 140. For example, the server 140 might not offer API methods that allow a device to directly connect. In that case, the maximum attachment size can be inferred based on previous interactions with the incoming email server 140. As discussed more in FIG. 6, the user device 110, outgoing email server 120, or a separate server such as a management server can store information regarding previous email transmissions to the incoming email server 140. In one example, the management server stores a table or other record that includes information regarding successful and unsuccessful email transmissions to particular email servers 140, including the size of attachments that were accepted or rejected by the servers 140.

Figure 2:
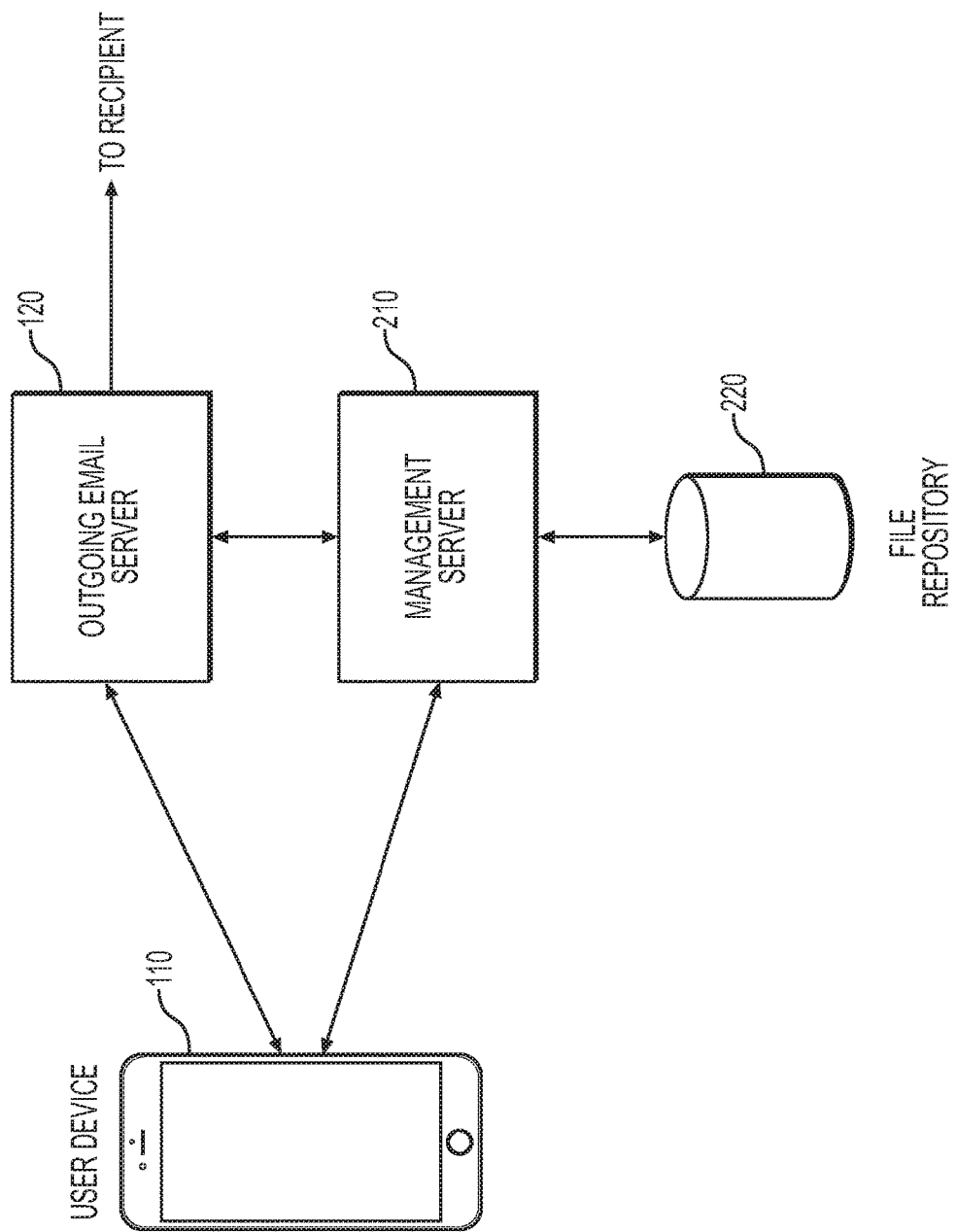
FIG. 2 is an exemplary illustration of system components.

FIG. 2 provides an illustration of system components for an example system. The system includes a user device 110 and outgoing email server 120, similar to the system of FIG. 1. The system of FIG. 2 also includes a file repository 220 and a management server 210 in communication with the user device 110, outgoing email server 120, and file repository 220. The management server 210 can provide additional functionality to various aspects of the email-sending process.

The management server 210 can control managed applications installed on the user device 110, such as a managed email application. An administrator can configure functionality and access restrictions for particular users or groups of users at the management server 210. Then the management server 210 can control file access and device functionality of the user device 110 accordingly. For example, the management server 210 can turn off functionality at the user device 110, such as printing, emailing, or Internet access. Additionally, a content application on a first user device can be configured to allow access to a first repository but not a second, whereas a second user device can be configured to access the second repository. These access and functionality settings can be stored in profiles that the management server 210 links to users or user devices.

The management server 210 can control managed applications through interaction with a management agent that can execute on the user device 110. The management agent 210 can be an application or part of an operating system, and can enable or disable functionality on the user device 110. The management agent 210 can be installed when the user device 110 enrolls with the management server 210, in one example. The management server 210 can be part of an enterprise mobility management ("EMM") system. The management server 210 can dictate which managed applications are installed, such as based on which user group a user belongs to. Similarly, specific functionality within the managed applications can be enabled or disabled by the management server 210, and can vary per user or user group.

The management server 210 can also provide information to a user device 110 regarding the outgoing email server 120 or incoming email server 140 relevant to an email being drafted on the user device 110. For example, the management server 210 can enforce a maximum attachment size for emails sent from a managed email application on the user device 110. The management server 210 can also set the maximum attachment size at the outgoing email server 120 and report that limit to the user device 110, eliminating the need for the user device 110 to reach out to the outgoing email server 120 to determine the size limit. Similarly, the management server 210 can access API methods at a recipient's incoming email server 140 to determine the size limit and report that limit to the user device 110.

The management server 210 can also provide access to a file repository 220. The file repository 220 can provide an alternative option to sending a large attachment by email. For example, if a file is too large to send through email, the email application at the user device 110 can provide the user with an option to send a link—rather than the file itself—that would allow the recipient to download the file from the file repository 220. In some examples, the user device 110 would send the file to the file repository 220 to be stored for access by an email recipient. The management server 210 can facilitate that process and provide a link for the email application to include in the email in place of the actual file.

In another example, the management server 210 can match the oversized attachment to an identical file already stored in the file repository 220. In that case, the email application of the user device 110 can replace the oversized attachment with a link to the file in the file repository 220. While FIG. 2 shows a single file repository 220, multiple repositories can be included. The repositories can have varying levels of security and accessibility, and the email application or management server 210 can determine an appropriate repository based on the intended recipient of the email. For example, a file attached to an email intended to be sent to another user in the same enterprise could be stored at a file repository 220 that provides full access to the recipient. On the other hand, a file attached to an email being sent out of the enterprise could be stored at a file repository 220 with greater security measures and less access for the recipient. As an example, the file may be provided to the recipient as a "view-only" file, without access to download, copy, save, or print. The file repository 220 can be a cloud repository or an on-premise repository.

Figure 3:
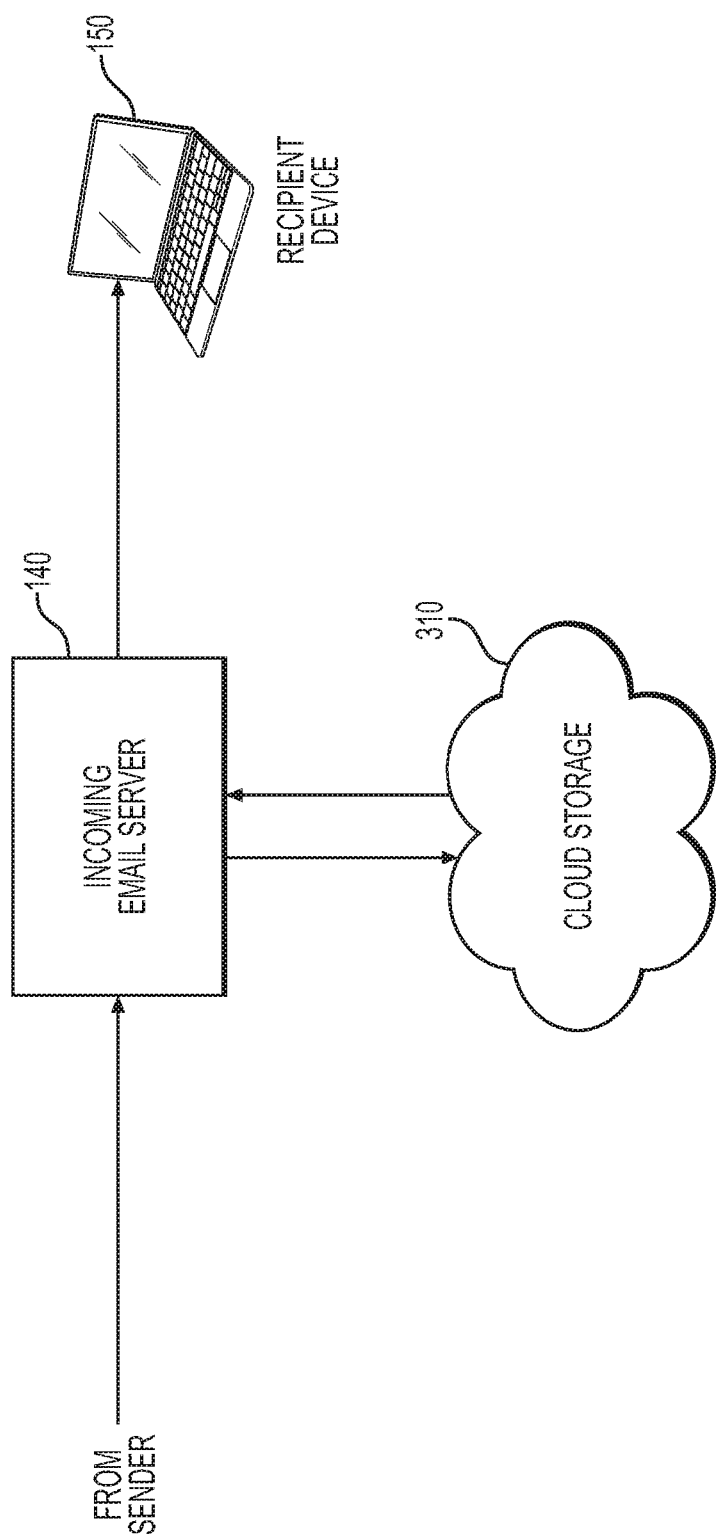
FIG. 3 is an exemplary illustration of system components.

FIG. 3 provides an illustration of system components for an example system showing the recipient's side of an email transmission. In the example of FIG. 3, the incoming email server 140 receives an email transmission from an outgoing email server 120. If the email transmission does not include any links to download an attachment, the email (and any attachments) can be forwarded directly to the recipient device 150. However, if the email includes a link to a file stored in a file repository, such as a cloud storage 310 location, the incoming email server 140 can access the cloud storage 310 and download the file before forwarding it, along with the remainder of the email, to the recipient device 150.

In another example, the recipient device 150 is provided with information sufficient to allow the device 150 to retrieve a file from the cloud storage 310 directly. In both examples, the recipient user can be presented with an interface that shows the file attached to the email, hiding the fact that the email transmission included a link and required a separate download from the cloud storage 310 location. This system would therefore conserve bandwidth and avoid email-delivery failures without disrupting the user experience on either end. In other examples, however, the recipient device 150 can receive a link requiring manual downloading of any files stored in cloud storage 310 instead of being directly attached to the email.

Figure 4:
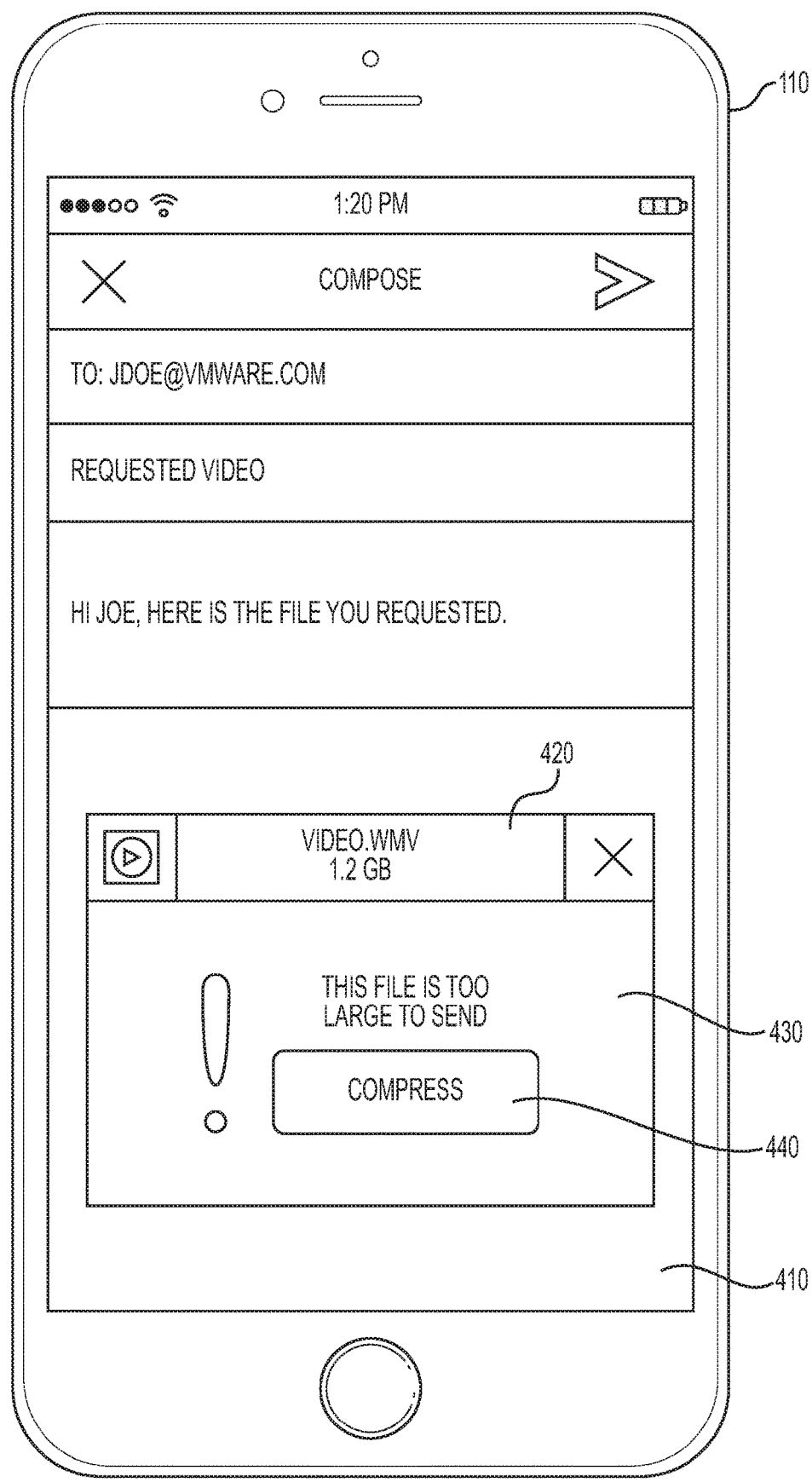
FIG. 4 is an exemplary illustration of an example graphical user interface.

FIG. 4 provides an illustration of an example user device 110 with a GUI 410 that can be used for sending an email from an email application. The GUI 410 includes traditional email-application features, such as a "TO:" field, subject field, and message field. The GUI 410 also includes buttons at the top that can delete or send the draft email, respectively. The GUI 410 also shows a visual file attachment 420 that follows the message field of the draft email. The visual file attachment 420 can include an icon representing the type of file, the name of the file, and a size estimate for the file. In the example of FIG. 4, the file is 1.2 GB.

In this example, the size of the attached file is too large for the outgoing email server 120 or incoming email server 140. As a result, a notification 430 is displayed on the GUI 410. In the example of FIG. 4, the notification 430 is displayed directly underneath the offending file—in this case the 1.2 GB video file. However, the notification 430 can be displayed in any manner or location. For example, the notification 430 can be displayed as a pop-up window that overlays the email application. The notification 430 can require action from the user before moving or minimizing to allow the user to continue drafting the email.

The notification 430 can also include a prompt for instructions from the user. In the example of FIG. 4, the notification 430 includes a button 440 labeled "Compress" that, if selected by the user, provides instructions to the user device 110 to compress the oversized file and attach the resulting compressed file. Although a single button 440 is shown in this example, the notification 430 can include multiple buttons 440. For example, the notification 430 can include a first button that reads "compress using MPEG-4," a second button that reads "compress using H.264," and additional buttons that include additional compression options. In another example, the notification 430 can ask the user for authorization to automatically compress attachments in the future. In that way, the user would not be interrupted when future email attachments exceed allowable limits. Alternatively, a first button can identify the top-ranked compression method, and a second button can allow the user to select a different compression method.

Figure 5:
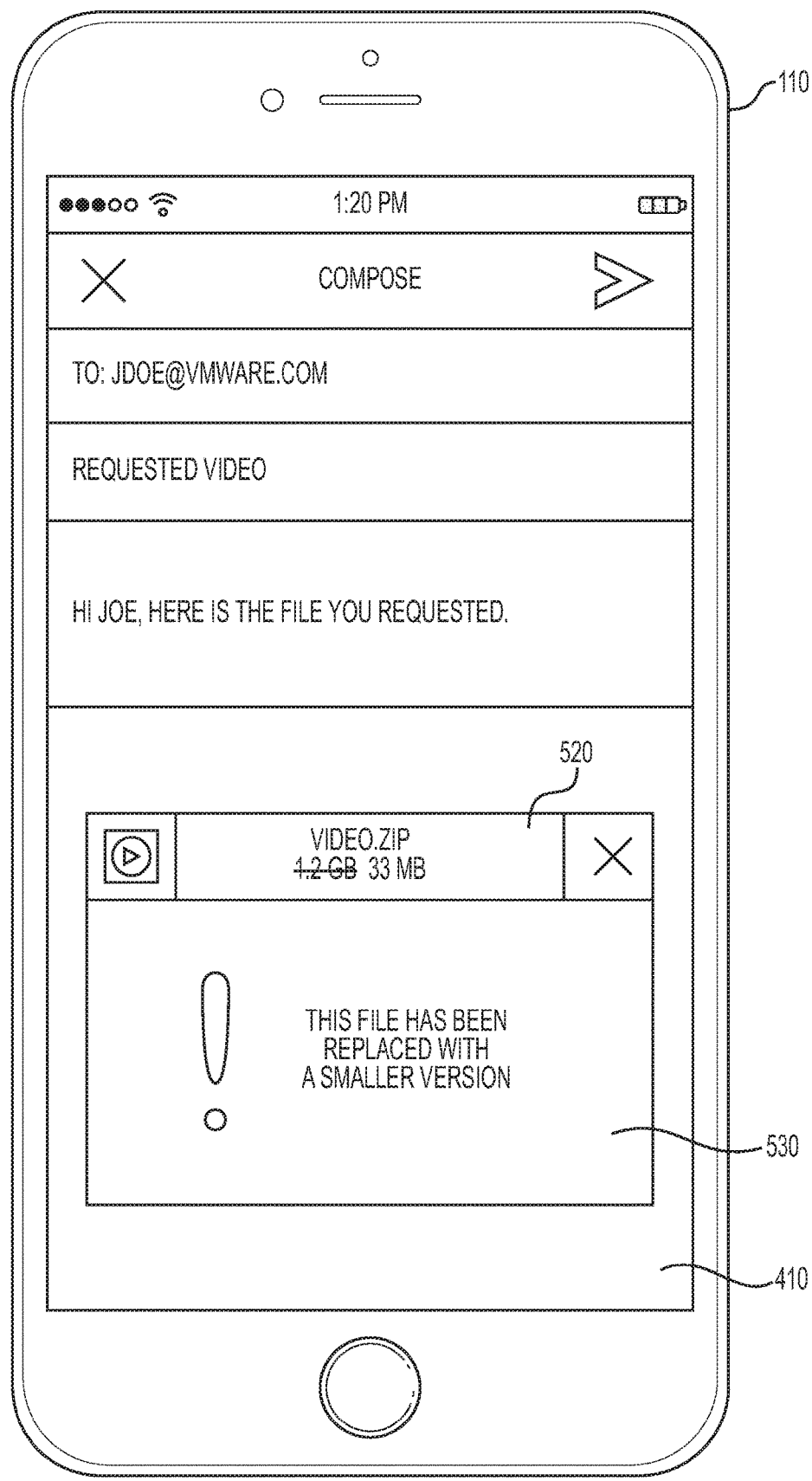
FIG. 5 is an exemplary illustration of an example graphical user interface.

FIG. 5 shows an illustration of an example user device 110 with a GUI 410 displaying a notification 530 after a file has been resized. A visual file attachment 520 is provided on the GUI 410 as well. The visual file attachment 520 includes an icon representing the file type, the name of the file, and a file size for the new, compressed file. In this case, the file has been compressed and renamed "video.zip." In addition to showing the current file size of 33 MB, the visual file attachment 520 can also show the previous file size, shown in FIG. 5 with a strikethrough.

The notification 530 can be displayed directly underneath the visual file attachment 520, as shown in FIG. 5. In other examples, however, the notification 530 can be displayed in other locations of the GUI 410 or as a pop-up window overlaying the email application interface. In this example, the notification 530 explains that the file has been replaced with a smaller version. The notification 530 can also include additional information and options. For example, the notification 530 can include an "undo" button that allows the user to reject the compressed file. The notification 530 can also include information about the maximum attachment size limit and its source. For example, the notification 530 can inform the user that "your email server does not allow attachments over 40 MB," or that "the recipient's email server does not accept attachments over 50 MB." Any other information can be included in the notification 530. The notification 530 can be customized by the user, through the settings in the email application, or by an administrator through the management server 210.

Figure 6:
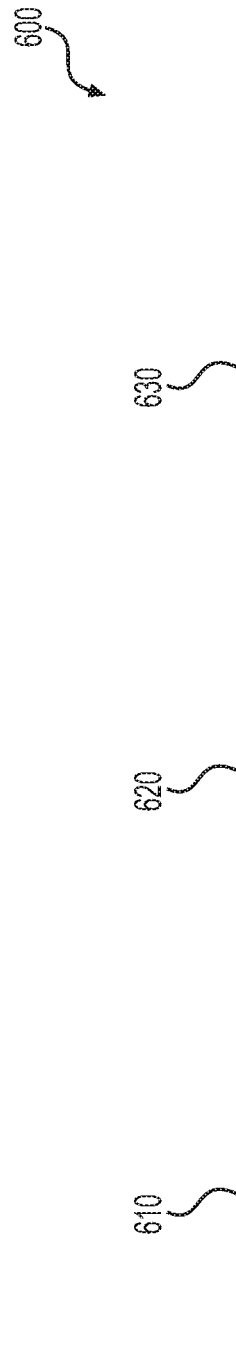
FIG. 6 is an exemplary illustration of a table utilized by system components in an example.

FIG. 6 provides an exemplary illustration of a table 600 utilized by system components to track and retrieve information regarding maximum attachment sizes accepted by various recipients. The table 600 can be stored at any system component, such as at the user device 110, outgoing email server 120, or management server 210. In some examples, the table 600 is stored in multiple locations. For example, the management server 210 can store a master version of the table 600 that is pushed down to a user device 110. If the management server 210 updates the table 600, it can send down a revised version of the table 600 to the user device 110.

The table 600 can include a column 610 storing email addresses and a column 620 storing server addresses for the email addresses listed in column 610. The table can also include a column 630 that includes the largest accepted file for a particular email address or email server listed in columns 610 or 620, respectively. The information regarding the largest accepted file can be based on experience or based on information from the relevant email server itself.

In some examples, the table 600 can include information retrieved directly from the relevant email server. For example, a recipient's email server 140 can provide access to an external device, such as the management server 210, outgoing email server 120, or user device 110 to retrieve email settings from the recipient's email server 140. In that example, the external device can access the email settings, using an API method at the recipient's email server, for example, and include that information in the table 600.

If the recipient's email server 140 does not provide sufficient access, the management server 210, outgoing email server 120, or user device 110 can compile information based on experience. Using the outgoing email server 120 as an example—when an email attachment is successfully transmitted to a recipient's incoming email server 140, the outgoing email server 120 can store information regarding the successful transmission. For example, if a 25 MB attachment is successfully transmitted to john@companyA.com, the outgoing email server 120 can fill the relevant data entry in column 630 with data indicating that the incoming email server 140 for that address accepted a 25 MB attachment. This information can be used in the future to determine whether to compress email attachments intended for john@companyA.com, or other email addresses associated with the same incoming email server 140 as that email address.

Although not shown in FIG. 6, the table 600 can include additional columns. For example, the table 600 can include a column for file sizes that have been rejected. This can be used to more accurately measure and record the maximum attachment size limit for an email server. In another example, the table 600 can include one or columns for dates associated with the largest accepted file or with files that have been rejected. This can allow the system to identify and track changes or updates to maximum attachment limits on recipient email servers 140. In another example, the outgoing email server 120 or management server 210 can parse a delivery-failure email send from a recipient's incoming email server 140 to determine whether the delivery-failure email includes an identification of a maximum attachment size limit. If the email includes this information, it can be extracted and stored in a column of the table 600.

In one example, the table 600 can include different columns for outgoing and incoming mail servers 120, 140. This can allow the system to separately track incoming and outgoing maximum file sizes, which can differ for the same server 120, 140. For example, outgoing email server 120 can have a different file size maximum for outgoing emails than it does for emails it receives as incoming email. When an email is rejected by either server 120, 140, the system can check to see whether the file size is smaller than the lowest stored maximum file size for the server 120, 140. The system can check based on the incoming email server column if the incoming email server 140 rejected the email, or check the outgoing email server column if the outgoing email server 120 rejected the email. If record indicates the currently stored maximum threshold is higher than the attachment size of the rejected email, the system can update the table 600 based on the incoming or outgoing email server 140 or 120 with the new lower threshold.

In some examples, the outgoing email server 120 or management server 210, or both, can be configured to automatically correct email failures. For example, when an email attachment exceeds the maximum attachment size of an incoming email server 140, the incoming email server 140 might deny delivery and send a notification email regarding the delivery failure. Rather than simply passing the notification email to the user device 110, the outgoing email server 120 or management server 210, or both, can intercept the notification email, make the appropriate corrections to the original email, and resend the email.

For example, the outgoing email server 120 might compress a file below its 35 MB maximum attachment size, but fail to account for a recipient email server's 140 25 MB maximum attachment size. In that example, the email would fail to deliver and the recipient's email server 140 would return a failure notification indicating a 25 MB limit. At that point, the outgoing email server 120 can access a copy of the failed email it send previously, compress the attachment below the 25 MB limit, and send a revised version of the original email. As a result, the user does not need to be involved in correcting and resending the email. The outgoing email server 120 can send a notification email to the user indicating that the email was rejected, automatically resized, and resent. The maximum attachment size for the recipient's email server 140 can also be stored in a column of table 600 for future use.

Figure 7:
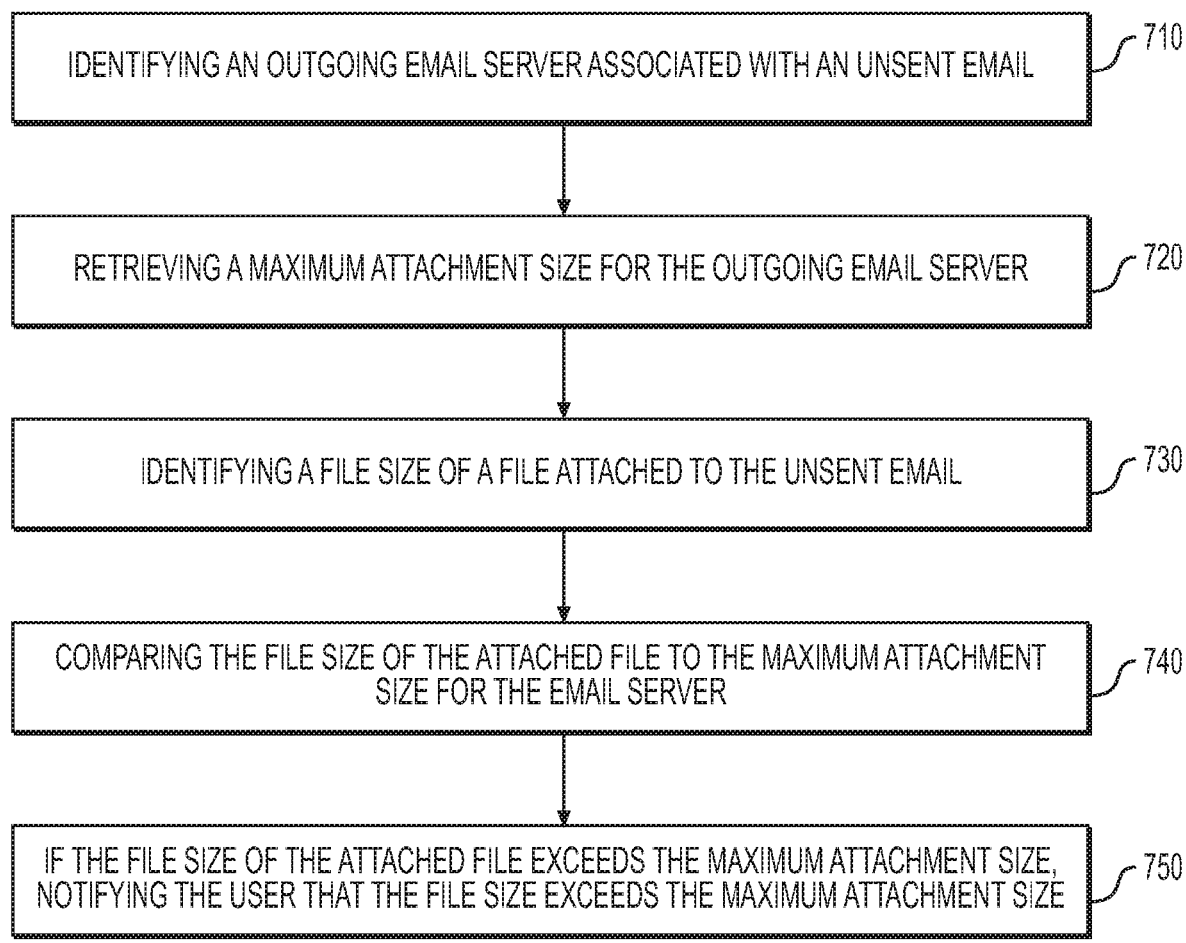
FIG. 7 is an exemplary method executed in a system.

FIG. 7 is a flowchart of an example method executed by system components described herein. Stage 710 of the method can include identifying an outgoing email server 120 associated with an unsent email. The outgoing email server 120 can be identified based on email settings at the user device or settings enforced by the management server 210, for example.

Stage 720 of the method can include retrieving a maximum attachment size for the outgoing email server 120. For example, the user device 110 can request the maximum attachment size from the outgoing email server 120 or from the management server. In another example, the user device 110 stores information locally that provides the maximum attachment size for the outgoing email server 120. In yet another example, the user device 110 makes one or more API calls to the outgoing email server 120 or management server 210 to retrieve the maximum attachment size.

Stage 730 of the method can include identifying a file size of a file attached to the unsent email. For example, when the user selects a file to attach to an unsent email, the user device 110 can identify the size of the file before it is attached. In another example, the user device 110 identifies the size of the file after it is attached. The user device 110 can optionally display the size of the attachment on the GUI of the user device 110.

Stage 740 of the method can include comparing the file size of the attached file to the maximum attachment size for the email server 120, 140. For example, the processor of the user device 110 can access the identified values of the maximum attachment size and the attached file itself. The processor can then compare the two values to determine how the two compare to one another.

Stage 750 of the method can include, if the file size of the attached file exceeds the maximum attachment size, notifying the user that the file size exceeds the maximum attachment size. For example, the processor of the user device 110 can cause a notification to display on a GUI 410 of the user device 110. The notification can indicate that the file size exceeds the maximum attachment size for the outgoing email server 120. The notification can also provide the user with options for compressing the file.

Figure 8:
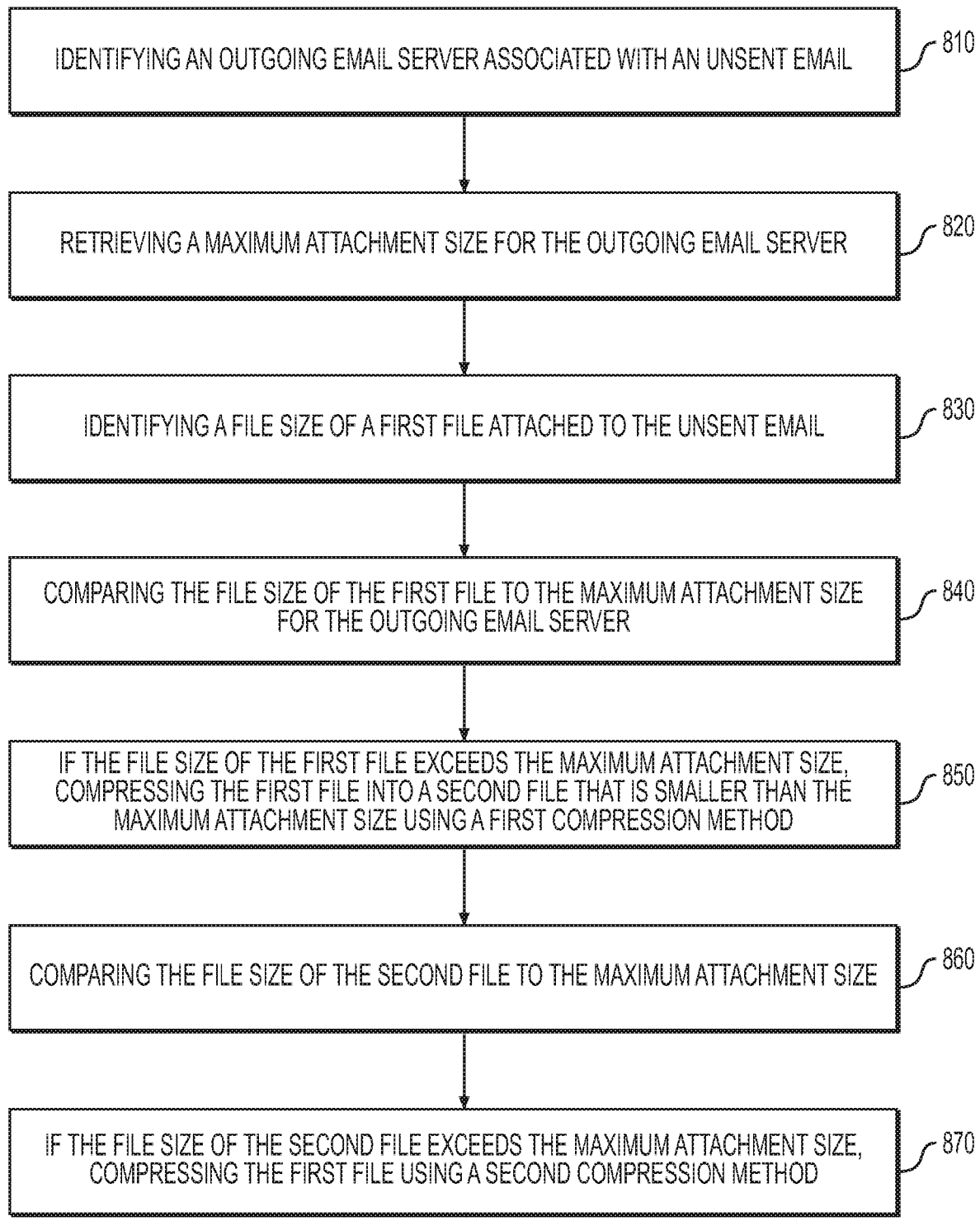
FIG. 8 is an exemplary method executed in a system.

FIG. 8 is a flowchart of an example method executed by system components described herein. Stage 810 can include identifying an outgoing email server 120 associated with an unsent email. The outgoing email server 120 can be identified based on email settings at the user device 110 or settings enforced by the management server 210, for example.

Stage 820 can include retrieving a maximum attachment size for the outgoing email server 120. For example, the user device 110 can request the maximum attachment size from the outgoing email server 120 or from the management server 210. In another example, the user device 110 stores information locally that provides the maximum attachment size for the outgoing email server 120. In yet another example, the user device makes one or more API calls to the outgoing email server 120 or management server 210 to retrieve the maximum attachment size.

Stage 830 can include identifying a file size of a first file attached to the unsent email. For example, when the user selects a file to attach to an unsent email, the user device can identify the size of the file before it is attached. In another example, the user device identifies the size of the file after it is attached. The user device can optionally display the size of the attachment on the GUI 410 of the user device 110.

Stage 840 can include comparing the file size of the first file to the maximum attachment size for the outgoing email server 120. For example, the processor of the user device can access the identified values of the maximum attachment size and the attached file itself. The processor can then compare the two values to determine how the two compare to one another.

Stage 850 can include, if the file size of the first file exceeds the maximum attachment size, compressing the first file into a second file that is smaller than the maximum attachment size using a first compression method. For example, the processor of the user device 110 can select a first compression method based on settings at the email application, user device 110, or management server 210. The processor can also cause the email application to un-attach the first file from the email and attach the second file instead.

Stage 860 can include comparing the file size of the second file to the maximum attachment size. For example, the processor of the user device 110 can access the identified values of the maximum attachment size and the second file. The processor can then compare the two values to determine how they compare to one another.

Stage 870 can include, if the file size of the second file exceeds the maximum attachment size, compressing the first file using a second compression method. For example, the processor of the user device 110 can select a second compression method with a more drastic data compression ratio relative to the first compression method. The email application can then attach the new file in place of the first or second files.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A system for handling oversized email attachments, the system comprising:
   a non-transitory, computer-readable medium that contains instructions;
   a processor that executes the instructions to perform stages including:
      identifying an email server associated with an unsent email in a managed email application executing on the user device;
      receiving table records from a management server, the table records comprising:
         a first column for outgoing email servers;
         a second column for incoming email servers;
         a third column for a maximum attachment size for each of the email servers, wherein at least one maximum attachment size is obtained by parsing a message associated with a prior rejected email; and
         a fourth column for file sizes that have been rejected;
      determining a file size of a first file attached to the unsent email;
      comparing the file size of the first file to the maximum attachment size for the email server using the table records;
      in an instance where the file size of the first file exceeds the maximum attachment size, compressing the first file into a second file that is smaller than the maximum attachment size; and
      attaching the second file in place of the first file.

2. The system of claim 1, wherein the management server updates the third column based on a value in the fourth column being lower than a value in the third column.

3. The system of claim 1, wherein the stages further include:
   identifying a recipient email server based on a recipient listed in the unsent email;
   retrieving a maximum incoming file size for the recipient email server; and
   in an instance where the file size of the attached file exceeds the maximum incoming file size for the recipient email server, notifying the user that the file size of the attached file exceeds the maximum incoming file size for the recipient email server.

4. The system of claim 1, wherein the stages further include prompting the user for instructions to compress the attached file.

5. The system of claim 4, wherein the compression is performed in response to the user providing instructions to compress the attached file.

6. The system of claim 1, wherein compressing the file comprises calculating a required data compression ratio based on the file size of the attached file and the maximum attachment size of the email server.

7. The system of claim 6, wherein compressing the file further comprises selecting a compression method based on the required data compression ratio.

8. A method for automatically resizing oversized email attachments, carried out by a processor of a user device, the method comprising:
- identifying an email server associated with an unsent email in a managed email application executing on the user device;
- determining a maximum attachment size for the email server;
- determining a file size of a first file attached to the unsent email;
- comparing the file size of the first file to the maximum attachment size for the email server;
- in an instance where the file size of the first file exceeds the maximum attachment size, compressing the first file into a second file that is smaller than the maximum attachment size;
- sending the email with the second file attached in place of the first file;
- intercepting, by a server, a failure notification from a recipient email server, wherein the failure notification includes a new maximum attachment size for the recipient email server;
- resizing, by the server, the attachment such that it is smaller than the new maximum attachment size; and
- resending, by the server, the email with the resized attachment.

9. The method of claim 8, wherein compressing the first file further comprises selecting a compression method based on a required data compression ratio.

10. The method of claim 8, wherein compressing the first file further comprises:
- compressing the first file using a first compression method;
- comparing the file size of the file compressed with the first compression method to the maximum attachment size; and
- if the file size of the file compressed with the first compression method exceeds the maximum attachment size, compressing the first file using a second compression method.

11. The method of claim 8, further comprising:
- comparing the file size of the first file to a maximum file size for incoming messages at the recipient email server; and
- if the file size of the first file or second file exceeds the maximum file size for incoming messages at the recipient email server, compressing the first file into a third file that is smaller than the maximum file size for incoming messages at the recipient email server.

12. The method of claim 8, further comprising sending a notification email to a user of the user device indicating that the email was rejected, automatically resized, and automatically resent to a recipient.

13. The method of claim 8, further comprising displaying a notice on a graphical user interface of the user device notifying a user that the first file will be compressed below the maximum attachment size of the email server.

14. The method of claim 8, wherein the comparing, compressing, and resending further comprises providing instructions to a secure email gateway to perform said comparing, compressing, and resending.

15. A non-transitory, computer-readable medium containing instructions that, when executed by at least one processor, perform stages for handling oversized email attachments, the stages comprising:
- identifying an email server associated with an unsent email in a managed email application executing on the user device;
- requesting a maximum attachment size from a management server that manages the email application and is separate from the email server, wherein the management server stores maximum attachment sizes for a plurality of email servers in a table;
- determining a file size of a first file attached to the unsent email;
- comparing the file size of the first file to the maximum attachment size for the email server;
- in an instance where the file size of the first file exceeds the maximum attachment size, compressing the first file into a second file that is smaller than the maximum attachment size;
- attaching the second file in place of the first file; and
- displaying a notification that the first file was replaced with the second file, wherein the notification displays the previous file size with a strikethrough and displays the new file size without a strikethrough.

16. The non-transitory, computer-readable medium of claim 15, wherein the stages further include compressing the file such that the file size of the compressed file is below the maximum attachment size of the email server.

17. The non-transitory, computer-readable medium of claim 15, wherein the stages further include:
- identifying a recipient email server based on a recipient listed in the unsent email;
- retrieving a maximum incoming file size for the recipient email server; and
- if the file size of the attached file exceeds the maximum incoming file size for the recipient email server, notifying the user that the file size of the attached file exceeds the maximum incoming file size for the recipient email server.

18. The non-transitory, computer-readable medium of claim 15, wherein the stages further include compressing the file such that the file size of the compressed file is below the maximum attachment size of the email server and the maximum incoming file size for the recipient email server.

19. The non-transitory, computer-readable medium of claim 15, wherein compressing the file further comprises selecting a compression method based on a required data compression ratio.

* * * * *